United States Patent [19]

Tagami

[11] Patent Number: 4,722,631
[45] Date of Patent: Feb. 2, 1988

[54] BALL-AND-SOCKET JOINT WITH RUBBER-CUSHIONED BALL

[75] Inventor: Masataka Tagami, Toyohashi, Japan

[73] Assignee: Musashi Seimitsu Kogyo Kabushiki Kaisha, Toyohashi, Japan

[21] Appl. No.: 24,578

[22] Filed: Mar. 11, 1987

[30] Foreign Application Priority Data

May 21, 1986 [JP] Japan .................. 61-116349
May 21, 1986 [JP] Japan .................. 61-116350

[51] Int. Cl.⁴ ................ F16C 11/00; F16D 1/12
[52] U.S. Cl. .......................... 403/133; 403/140
[58] Field of Search .......... 403/133, 140, 132, 139, 403/135, 124, 125, 126

[56] References Cited

U.S. PATENT DOCUMENTS

| 1,868,818 | 7/1932 | Eksergian | 403/132 X |
| 2,444,121 | 6/1948 | Venditty | 403/135 X |
| 2,970,853 | 2/1961 | Baker | 403/125 |
| 3,375,028 | 3/1968 | Patton | 403/126 |
| 3,495,858 | 2/1970 | Kindel | 403/140 |
| 4,334,795 | 6/1982 | Westphal | 403/131 |

FOREIGN PATENT DOCUMENTS

| 2244645 | 3/1974 | Fed. Rep. of Germany | 403/124 |
| 2630205 | 1/1978 | Fed. Rep. of Germany | 403/133 |
| 57-1815 | 7/1982 | Japan . | |
| 154050 | 4/1956 | Sweden | 403/133 |

Primary Examiner—Andrew V. Kundrat
Attorney, Agent, or Firm—Ladas & Parry

[57] ABSTRACT

A ball-and-socket joint has a ball shell of basically spherical shape, a ball stud with a ball head integrally formed at an extremity thereof and disposed within the ball shell, and a rubber layer interposed between and joining the ball shell and the ball head. The outer surface area of the ball shell on the distal side, remote from a shank of the ball stud, of an equatorial plane passing through the center of the ball head perpendicularly to the ball stud axis is greater than the outer surface area of the remainder of the ball shell on the other, or proximal, side of the equatorial plane. The rubber layer is, therefore, made thicker at parts thereof calculated to withstand loads transmitted between the ball shell and the ball head.

6 Claims, 4 Drawing Figures

BALL-AND-SOCKET JOINT WITH RUBBER-CUSHIONED BALL

BACKGROUND OF THE INVENTION

This invention relates generally to ball-and-socket joints (hereinafter referred to as ball joints) and more particularly to a ball joint with a rubber-cushioned ball for improving the vibration and impact absorbing performance of the ball joint, which is suitable for use in mechanisms such as automotive suspensions and steering linkages.

Rubber-cushioed ball studs for improving the vibration and impact absorbing capability of ball joints are known in the prior art. In a known ball joint of this character, a layer of rubber is interposed between the ball-shaped extremity or head of the shank of the ball stud and a spherical outer shell. Examples of such structure are disclosed in the specifications of U.S. Pat. No. 4,334,795 to P. Westphal and Japanese Patent Application Laid-Open (Kokai) No. 1815/1982. As will be described more fully hereinafter, the rubber layer and the spherical shell encompassing the ball-head extremity of the ball stud in such a ball joint are substantially concentric relative to the ball-head extremity and are of substantially symmetrical shape above and below the equatorial plane passing centrally through the ball-head extremity of the ball stud perpendicularly to the axis of the ball stud.

In a ball joint having a known rubber-cushioned ball stud of this character, a load applied to the shank of the ball stud relative to the ball shell causes a great relative displacement in the stud axial direction between the shell and the ball-head extremity of the ball stud. Particularly in the case where the shank becomes displaced toward its extremity relative to the socket, if the shank is swung laterally about the ball center, the shank will tend to strike the rim of the socket opening and become damaged.

Still another problem accompanying this known ball joint is that when a great load acts on the shank in the direction toward its extremity, the rim of the outer or lower opening of the ball shell tends to bite into the lower or outer bearing of the socket in contact with the shell, whereby the bearing surface becomes damaged.

For these reasons, the use of these known rubber-cushioned ball joints has been restricted to those for low loads, or, for the same loads, a ball joint of this character was unavoidably of considerably greater outer diameter than a ball joint without a rubber layer.

Further, as noted hereinbefore, when these known ball joints with a rubber-cushioned ball stud are subjected to a load between the socket and the ball stud, the relative positional relationship between the ball shell and the ball-shaped extremity or head of the shank of the ball stud is disturbed, and the semispherical part of the rubber layer receiving the load becomes thinner. This tendency increases with increase in the applied load and gives rise to a disadvantageous lessening of the capacity of the rubber layer to absorb vibration and impact. In order to overcome this difficulty, it is necessary to increase the outer diameter of the ball-like extremity of the shank of the ball stud, whereby the size of the entire ball joint becomes disadvantageously large.

SUMMARY OF THE INVENTION

It is the main object of this invention to provide a ball-and-socket joint in which the above mentioned problems of the shank tending to strike the rim of the socket opening, and of the rim of the outer opening biting into the lower bearing of the socket are overcome.

It is a further object of this invention to provide a ball-and-socket joint in which the above mentioned problem of the semispherical part of the rubber layer receiving the load becoming thinner is overcome.

According to this invention, the main object of this invention can be achieved by using a generally-spherical ball shell of two semispherical portions. The outer surface area of its outer semispherical portion, more remote from the shank of the ball stud (between an equatorial plane and a smaller, lower second opening in a preferred embodiment), is greater than the outer surface area of its remainder or inner semispherical part.

By the above described measure, the shell outer surface area in sliding contact with an outer bearing becomes amply large within the restricted spherical diameter, and the load per unit area imposed on the bearing and shell is reduced. Furthermore, the outer semispherical shell part of greater outer surface area coaxially confronts the ball-like head of the ball stud shank substantially in the axial direction of the socket and thus supports outward loads toward the shank extremity, whereby the relative displacement between the shell and the ball-like head of the shank is reduced.

According to this invention, the further object thereof can be achieved by providing a rubber cushion bonding the ball head of the shank to the inner surface of the shell by interposing therebetween a rubber layer in a precompressed state. The position of the ball-like head relative to the shell in the unloaded free state of the ball joint is offset so that the rubber layer portion to receive a compressive load when the ball joint is installed in a specified state has a greater thickness in the unloaded state than the other rubber layer portions.

By the above described measure, constituting another important feature of this invention, the thickness of the rubber layer portion subjected to a compressive load when the ball joint is installed in its specified state and the load is applied thereto will be maintained at a suitable thickness relative to the thickness of the rubber layer on the opposite side.

The nature, utility, and further features of this invention will be more clearly apparent from the following detailed description when read in conjunction with the accompanying drawings, briefly described below.

DETAILED DESCRIPTION OF THE INVENTION

As conducive to a full understanding of this invention, the general nature, attendant problems, and limitations of a conventional ball joint with a rubber-cushioned ball stud will first be briefly described with reference to FIG. 4.

Figure 4:
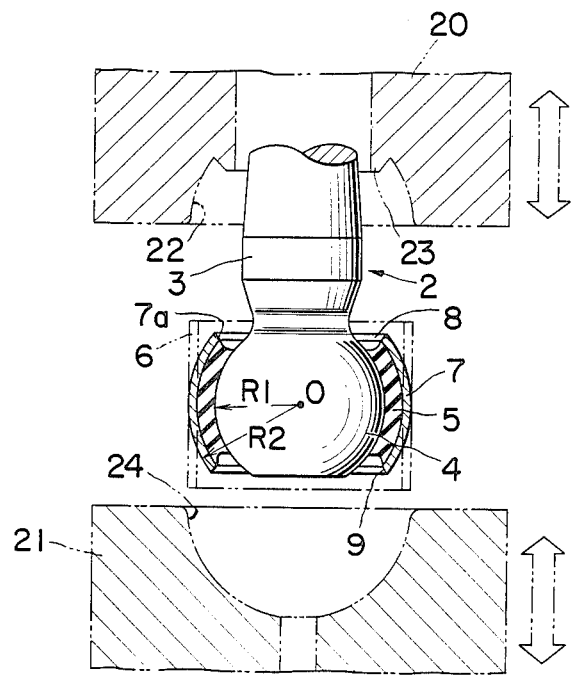
FIG. 4 is a side view similar to FIG. 2 showing the formation of a spherical shell in the fabrication of a conventional rubber-cushioned ball stud.

FIG. 4 illustrates an example of a conventional rubber-cushioned ball stud of the type disclosed in the previously mentioned publications. As mentioned briefly hereinbefore and as shown, a shell 7' encompasses the ball-like extremity or ball head 4' of the shank 3' of a ball stud at 2'. A rubber layer 5' is interposed therebetween. These 2 are provided in a substantially symmetrical configuration on opposite sides of an equatorial plane of the ball-head 4'. The ball head 4' and the shell 7' have a common center O and have radii $R_1'$ and $R_2'$, respectively. In this rubber-cushioned ball stud, a load applied to the shank 3' or and the shell 7' can cause a large relative displacement between the shell 7' in the axial direction and the ball head 4'. Particularly in the case where the shank 3' is displaced outward, toward its ball extremity, and swing laterally, it is then apt to strike the rim 7a' of the socket opening receiving it and thereby be damaged.

Another difficulty is that, when a great load is applied to the shank 3' in the direction toward its outer, ball-like extremity or ball head 4', the rim of an outer opening 9' of the shell 7', i.e. its opening opposite the shank 3', is apt to gall or bite into a bearing for the shell, thereby damaging the bearing surface. For these reasons, the applications of rubber-cushioned ball joints of this conventional character have been limited to low-load mechanisms, or, in order to withstand the same loads as ball joints without interposed rubber layers, of considerably greater size than the ball joints without interposed rubber layers.

Another problem accompanying this conventional ball joint with the rubber-cushioned ball stud at 2' is that, when it is installed in a motor vehicle, a load applied to the ball stud at 2' and a socket enclosing the shell 7' destroys the relative positional relationship between the shell 7' and the ball head 4' of the shank 3', whereby the rubber layer 5' on one side of the equatorial plane becomes thin. This tendency, which increases in severity with increasing load, gives rise to a drop in the capacity of the rubber layer to absorb vibration and impact. In order to cope with this drawback, it has been necessary to increase the outer diameter of the spherical head of the shank 3' of the ball stud, whereby the ball joint as a whole has unavoidably become large.

The above described difficulties encountered in the prior art in relation to ball joints with rubber-cushioned ball studs have been overcome by this invention which will now be described in detail with respect to preferred embodiments thereof.

Figure 1:
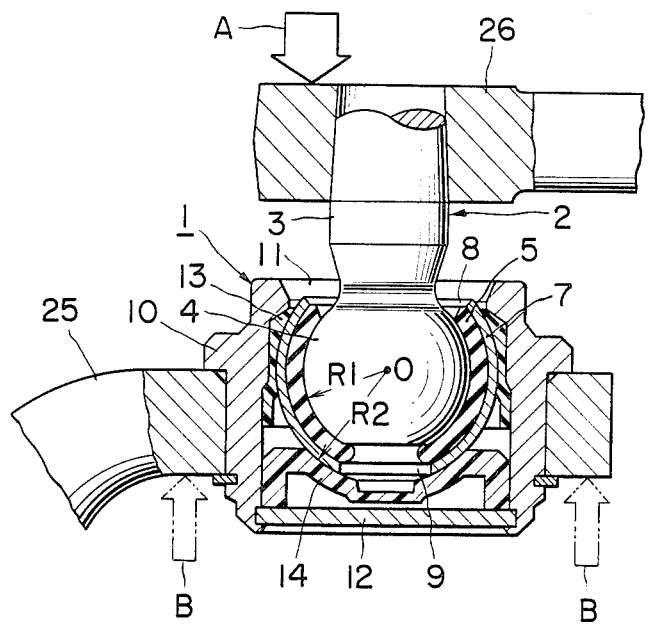
FIG. 1 is a side view, partly in longitudinal section with parts cut off, showing an embodiment of ball joint according to the invention which is used in the mechanism of a suspension of a motor vehicle.

In an embodiment of the ball joint of this invention as illustrated in FIG. 1, the essential, corresponding parts of the ball joint assembly at 1 are: a ball stud 2 having a shank 3 and, at its one, joint end thereof, and integrally-fixed ball head 4 having the center O, a radius $R_1$ and a generally, but not necessarily strictly spherical surface; a ball shell 7 also having the common center O, but a radius $R_2$, and encompassing the spherical surface of the ball head 4 laterally about the axis of the ball stud; and a rubber layer 5 interposed between the ball shell 7 and the ball head 4.

A socket casing 10 having upper and lower openings 8 and 9 axially of the ball stud. An upper bearing 13 made of a synthetic resin and a lower bearing 14 made of a urethane rubber respectively fitted in upper and lower parts of the interior of the socket casing 10, partly encompassing and rotatably holding the ball shell 7. A retaining plate 12 is secured around its periphery to the rim of the lower opening of the socket casing 10 to retain the above enumerated parts within the casing 10 in the assembled state.

The socket casing 10 has a shape substantially of a hollow cylinder with its lower end opening closed by the retaining plate 12 as described above. The upper end opening 11 of the socket casing 10 is adapted to encompass a necked portion of the shank 3 of the ball stud at 2 with ample clearance for limited swinging of the ball stud relative to the socket casing 10 as in known ball joints. Thus, sliding movement takes place between the inner spherical surfaces of the bearings 13 and 14 and the outer spherical surface of the ball shell 7 when the ball stud swings or rotates relative to the socket casing 10.

FIG. 1 illustrates the case wherein the ball joint at 1 of this invention is used in the the upper side of a double-wishbone type suspension of a motor vehicle. In this application, the upper part of the ball stud 2 is fixed to the outer end of an upper arm 26, while the socket casing 10, is fixed to the outer end of a knuckle arm 25. In a normal loading situation, the upper arm 26 exerts on the ball head 4 a downward load A, which, under a state of equilibrium, is balanced by an upward force B exerted by the knuckle arm 25 on the socket casing 10. For this reason, the part of the rubber layer 5 around the extremity of the ball stud 2, that is, the lower half portion of the rubber layer 5 below the equatorial plane of the ball head perpendicular to the axis of the ball stud 4, is subjected to a compressive load.

The ball stud 2 is fabricated and assembled in the following manner. The ball 4 and necked portion of the shank 3 of the ball stud 2 are first formed by cold plastic working, then finished by machining, and subjected to heat treatment such as carburizing according to necessity. The shell 7 is fabricated by first cutting a hollow cylinder of suitable length, as described hereinafter, from a steel tube of the desired, i.e. uniform, wall thickness and forming this cylinder into a cup-like structure 6 as indicated by two-dot chain line in FIG. 2 by a process (not shown) such as press forming.

Then, in a mold (not shown), the tentatively-formed shell of cup-like structure 6 and the ball head 4 are set at correct relative positions, as described hereinafter, and rubber is poured into the space therebetween and vulcanized thereby to bond together the sturcture 6 and the ball head 4. The structure 6 thus assembled with and bonded to the ball head 4 is then pressed between cup dies 20 and 21 as shown by two-dot chain line in FIG. 2 thereby to form the structure 6 into the finished shell 7 of partial spherical shape.

Figure 2:
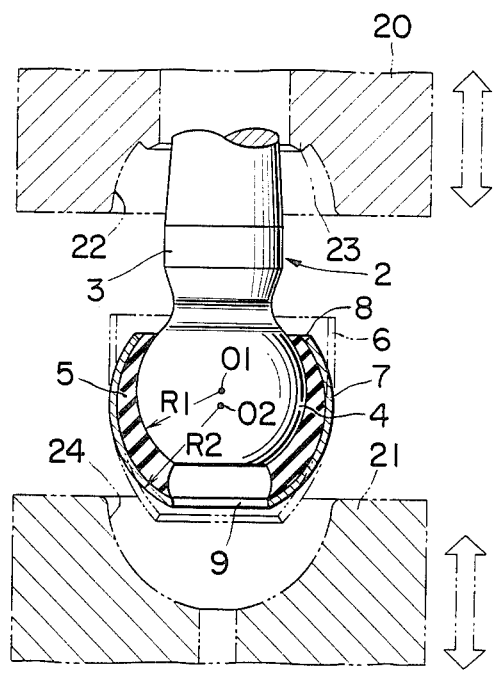
FIG. 2 is a side view, partly in longitudinal section, indicating the manner in which a spherical metal shell is formed around the ball head, over a rubber layer, in the fabrication of the rubber-cushioned ball stud of the ball joint shown in FIG. 1.

The aforementioned suitable length of the cylindrical piece cut off the steel tube to become the structure 6 and then finally the shell 7 is such that after the shell 7 has been formed as described above, the diameter of the lower shell opening 9 will be smaller than that of the upper shell opening 8. Furthermore, the aforementioned correct relative positions at which the structure 6 and the ball head 4 are set in a mold before the rubber is poured into the space therebetween are such that the portion of the rubber layer to be subjected to compressive load when the ball joint assembly is installed as intended will be of greater thickness than other portions of the rubber layer. That is, in the illustrated embodiment, the ball 4 is so positioned relative to the structure 6 that the gap therebetween at its extreme end portion (lower portion as viewed in FIG. 2) is greater than the gap therebetween near the root or upper portion of the ball head 4. In order to have the relative position of the ball 4 to the shell 7, the center $O_1$ of the ball 4 having a radius $R_1$ and the center $O_2$ of the shell 7 having a radius $R_2$ in the unloaded, free state of the ball joint are offset as shown in FIG. 2. This is an important feature of this invention.

As the structure 6 is formed into a spherical shell 7 in the above described manner, the opposite ends (upper and lower ends) of the rubber layer 5 in the axial direction of the ball stud 2 are firmly compressed, and a compressive stress which is ample for preventing peeling of the rubber layer 5 during use of the ball joint assembly 1 is applied to the rubber layer.

As described hereinabove, the diameter of the outer or lower opening 9 of the shell 7 is made smaller than that of the inner or upper opening 8 thereof in the forming of the structure 6 into the spherical shell 7. As a consequence, the outer surface area of the upper semispherical portion of the shell 7, that is, that portion above the equatorial plane, is less than the outer surface area of the lower semispherical portion of the shell 7 below the equatorial plane. This is another important feature of this invention.

In accordance with this invention as described above, the outer surface area of the shell 7 on the extremity side of the ball head 4, which slides in contact with the socket bearing 14, becomes amply large within the limited spherical diameter, and the imparted load per unit area between the bearing and the shell is thereby reduced. therefore, the load limit below which the opening 9 of the shell 7 at the extreme outer end of the ball stud 2 will not score or bite into the lower resin bearing 14 can be elevated without an increase in the outer diameter of the ball joint assembly.

Furthermore, the outer or lower semispherical part of the shell 7 confronts the ball head 4 substantially in the axial direction of the socket casing 10 and supports any outward load, i.e., downward load, and the relative displacement of the shell and the ball head is reduced. Therefore, interference or striking between the shank 3 of the ball stud 2 and the socket casing 10 is prevented.

In the press forming of the sturcture 6 into the shell 7 as illustrated in FIG. 2, the shank ball head 4 is displaced relative to the structure 6 toward the inner end thereof, whereby the portion of the rubber layer 5 on the outer side or extreme outer side of the ball head 4 is formed to be amply thicker than the rubber layer portion on the inner or opposite side.

According to this invention in one aspect thereof as described above, the thickness of the rubber layer in its portion to be subjected to loads is made beforehand amply greater than that at the opposite portion thereof. As a result, when the ball joint assembly is installed in the specified position and a specific load is applied to the rubber layer, the portion of the rubber layer thus formed to bear the load is maintained at a suitable thickness similar to the thickness of the rubber layer portion on the opposite side. Accordingly, the vibration and impact absorbing characteristic of the ball joint in its installed state and under a load can be greatly improved without increasing the size of the ball joint assembly.

In the embodiment shown in FIG. 2 and described above, the thickness of the rubber layer 5 is made greater toward the extremity of the ball stud 2 in order to bear axial downward loads exerted by the ball head 4 toward the extremity side or lower side of the ball shell 7.

Figure 3:
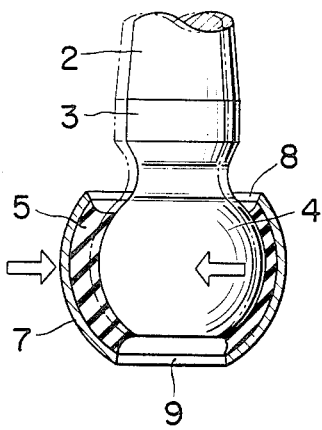
FIG. 3 is a side view, partly in longitudinal section, showing a rubber layer which has been made thicker on one lateral side to resist a side load between the ball shell and the ball head of the ball stud.

In a modified ball stud 2 as shown in FIG. 3, the rubber layer 5 is made thicker on one lateral side (left side) in order to receive lateral loads as indicated by arrows. In this embodiment, a leftward force is indicated as being applied by the ball head 4 against the inner surface of the thick part of the rubber layer 5, whereby the ball head is displaced leftward as indicated by two-dot chain line. This force is countered by a rightward reactive force exerted by the ball shell 7 against the outer surface of the thick part of the rubber layer 5. In this embodiment, the thickness of the rubber layer 5 is the greatest at the one lateral portion thereof and is the least at the opposite lateral portion. It is to be noted that the opposite lateral portion need not be a strictly opposite portion and may be a substantially opposite portion depending upon how the ball-and-socket joint is used.

What is claimed is:

1. In a ball-and-socket joint comprising a ball structure provided at the extremity of a shank of a ball stud and a socket casing provided therein with bearing surfaces for slidably bearing and holding said ball structure, the improvement wherein said ball structure comprises an outer ball shell of basically spherical which has, at coaxially opposite ends thereof, first and second circular openings of respectively larger and smaller diameters, a ball-head extremity of the shank inserted through said first opening into the ball shell and disposed within the ball shell in spaced-apart relation thereto, and a precompressed rubber layer interposed between and joining the ball shell and said ball-head extremity, the area of the part of the outer surface of the ball shell nearer said second opening with respect to an equatorial plane passing through the center of the ball-head extremity perpendicularly to the shank axis being greater than the area of the remainder part of the outer surface of the ball shell nearer said first opening with respect to said equatorial plane.

2. A ball-and-socket joint as claimed in claim 1 wherein the thickness of said rubber layer is so varied at the time of fabrication of said ball structure that the portions of the rubber layer which are calculated to resist greater stress when the ball-and-socket joint is installed in a specific mechanism and is subjected to a calculated maximum service load are thicker than other portions of the rubber layer.

3. A ball-and-socket joint as claimed in claim 2 wherein the thickness of the rubber layer is the greatest at its portion nearest said second opening and decreases toward said first opening.

4. A ball-and-socket joint as claimed in claim 2 wherein the thickness of the rubber layer is the greatest at a lateral portion thereof remote from the shank axis and is the least at a lateral portion on substantially the opposite side of the ball-head extremity.

5. A ball-and-socket joint, comprising:
a ball stud having a shank with a ball head on one end thereof;
a generally-spherical ball shell encompassing the ball head and having first and second, circular openings opposite each other relative to the axis of the ball stud, the shank of the ball stud passing through the first opening and the second opening having a smaller diameter than the first, the area of the outer surface of the ball shell on the same side of an equatorial plane through the ball head perpendicularly to the axis of the ball stud as the second opening being greater than the area of the outer surface of the ball shell on the opposite side of the equatorial plane; and a precompressed rubber layer interposed all between and joining the ball head and ball shell.

6. The ball-and-socket joint as claimed in claim 5, wherein the ball head is spherical and the ball shell has a uniform thickness, whereby the rubber layer becomes progressively thicker away from the shank when there is no load on the joint to compensate for a load axially of the shank toward the ball shell.

* * * * *